United States Patent [19]

Pedersen et al.

[11] Patent Number: 4,547,626
[45] Date of Patent: Oct. 15, 1985

[54] FIRE AND OIL RESISTANT CABLE

[75] Inventors: Jack R. Pedersen, Moss; Hans R. Thomassen, Oslo; Svein Henriksen, Son, all of Norway

[73] Assignee: International Standard Electric Corporation, New York, N.Y.

[21] Appl. No.: 617,415

[22] Filed: Jun. 5, 1984

[30] Foreign Application Priority Data

Aug. 25, 1983 [NO] Norway .................................. 83305

[51] Int. Cl.$^4$ ............................................. H01B 7/28
[52] U.S. Cl. .................... 174/107; 174/109; 174/121 A; 428/383; 428/389
[58] Field of Search ................... 174/107, 109, 121 A; 428/383, 384, 389; 138/123, 127; 87/9

[56] References Cited

U.S. PATENT DOCUMENTS

| | | | |
|---|---|---|---|
| 2,977,839 | 4/1961 | Koch | 138/123 X |
| 3,180,925 | 4/1965 | Ege | 174/102 R |
| 3,240,867 | 3/1966 | Maddox | 174/109 |
| 3,576,388 | 4/1971 | Bruns | 174/116 |
| 4,001,128 | 1/1977 | Penneck | 174/137 B X |
| 4,051,324 | 9/1977 | Anderson et al. | 174/121 A |
| 4,150,249 | 4/1979 | Pedersen | 174/107 X |
| 4,280,016 | 7/1981 | Ege | 174/102 R |
| 4,370,076 | 1/1983 | Sullivan et al. | 428/389 X |
| 4,430,470 | 2/1984 | Taniguchi et al. | 174/100 S R X |
| 4,456,654 | 6/1984 | Kotian | 428/391 X |

FOREIGN PATENT DOCUMENTS

| | | | |
|---|---|---|---|
| 3007341 | 9/1981 | Fed. Rep. of Germany | 174/121 A |
| 3204667 | 8/1983 | Fed. Rep. of Germany | 174/121 A |
| 2050041 | 12/1980 | United Kingdom | 174/121 A |
| 1533956 | 2/1981 | United Kingdom | 174/121 A |
| 2059140 | 4/1981 | United Kingdom | 174/121 A |

OTHER PUBLICATIONS

LaGase, F. E. et al., Material and Cable Design for Nuclear Power Generating Station Installations, General Electric; 9/75.

Matsuo, J. et al., Development of Flame Resistant Cables for Nuclear Power Plant and Their Qualification Test Results; Proceedings of 26th International Wire and Cable Symposium, Cherry Hill, N.J. U.S.A., Nov. 15-17, 1977.

Primary Examiner—A. T. Grimley
Assistant Examiner—Morris H. Nimmo
Attorney, Agent, or Firm—John T. O'Halloran; Mary C. Werner

[57] ABSTRACT

A cable is described which has improved flame/fire and oil/abrasion resistant properties. The cable is halogen free since the conductor insulation and all sheaths are of the self-extinguishing type. A metal screen braided at an angle between 35° and 45° formed between the individual wires and a plane at right angles to the cable axis over a vulcanized filler sheath provides protection of the cable conductors during fires. Outermost there is placed a thin oil and abrasion resistant extruded layer of nylon.

12 Claims, 1 Drawing Figure

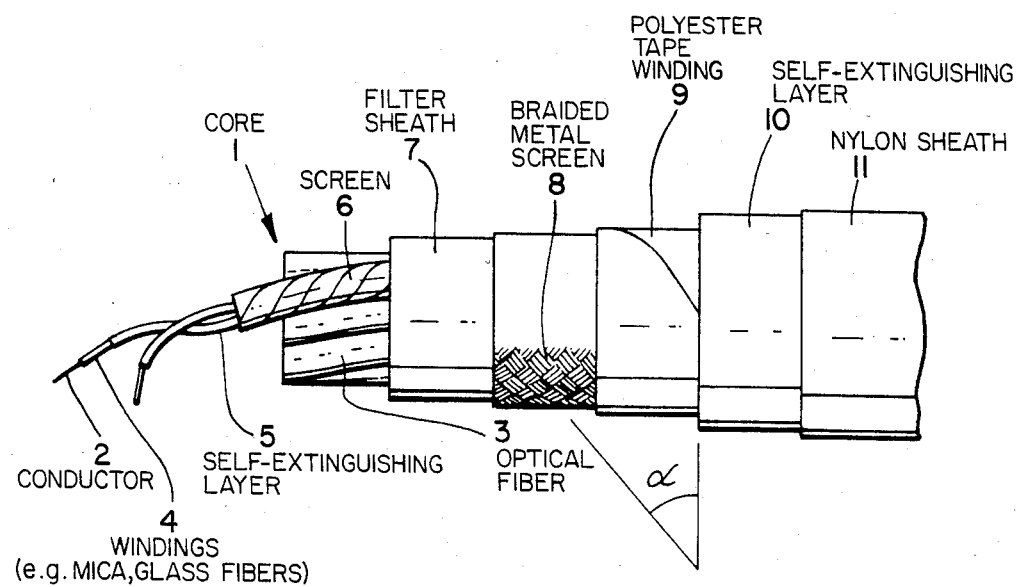

FIRE AND OIL RESISTANT CABLE

BACKGROUND OF THE INVENTION

The present invention relates to cables and in particular to halogen free cables with improved flame/fire resistance and oil/abrasion resistance.

Conventional flame retardant cables are usually made with halogen containing materials like polyvinylchloride (PVD), polychloroprene (PCP), chlorosulphonated polyethylene (CSP), etc. In a fire these materials give off thick, dense and corrosive smoke. In some cable installations this is not considered a drawback, but in sites like oil production platforms, hospitals, telephone exchanges and the like, such reactions are not acceptable. Cables containing halogen free materials have, however, also been known for some time.

A cable having an insulation which, when it is subjected to very high temperatures or even flames, is transformed into an electrically insulating ash, may maintain its working capacity during and after a fire. An assumption is that the insulating ash is kept safe in position within the cable, and also that the cable is fastened securely to constructions which are stable during the fire to avoid bending and mechanical stress in the cable.

Even when all such assumptions are fulfilled, known cables have evidenced a high percentage of failures during flame tests.

One of the main problems encountered in connection with installation of cables in potential fire areas is that the cable insulation may collapse during a fire so that the conductor(s) will shortcircuit to the metal screen. This problem and several solutions have been described in U.S. Pat. Nos. 3,180,925 and 4,280,016.

The cables concerned are usually built up from one or more individually insulated conductors and/or optical fibers, which are embedded in a filler sheath of halogen-free material. The cables also include a braided metal screen as well as outer protective covers.

One theory of how the failures occur in such conventional cables when subjected to high temperatures is as follows: As the insulation and the inner sheaths are burned to ashes, the cable diameter tends to increase slightly. The braid which is applied around the inner sheath, is then radially expanded, and this again results in a longitudinal contraction of the braid. As this longitudinal contraction occurs simultaneously with the radial expansion, the frictional forces between the burned insulation and the multiwire conductor elements become very large. Therefore, the longitudinal contraction of the braid will be frictionally transferred to the helical, outer elements of the multiwire conductor and further to the center wire. Because of their helical form, the outer elements of the multiwire conductor are free to contract in the longitudinal direction. The center wire, on the other hand, in a conventional multiwire conductor, is a straight element, and a contraction in longitudinal direction beyond the elasticity limit, is impossible. Instead, there will be built up a longitudinal compression force until the center wire kinks in an uncontrolled manner. The other elements of the multiwire conductor will then also be forced out in a kink and may, if a large kink occurs, make contact with the metal braid, which finally results in a short circuit of the cable. Uncontrolled kinks as described occur mostly in cables and conductors with cross-sectional conductor areas in the order of 0.5 to 2.5 mm$^2$ and when the number of conductors within the cable is low (10).

SUMMARY OF THE INVENTION

An object of this invention is to provide improved electric cables (power and telecom), which will maintain circuit integrity under high temperature conditions.

An additional object is also to provide fire resistant cables which have high oil and abrasion resistance.

In pursuance of these objects, one feature of the present invention resides in the provision of a fire-resistant cable comprising at least one conductor; a cover of an insulating material disposed on the outer surface of the at least one conductor; and a metallic screen including wires braided with respct to a plane perpendicular to the cable axis at such a predetermined angle that longitudinal shrinkage of the screen upon an increase in cable diameter is reduced and integrity of the at least one conductor is maintained.

BRIEF DESCRIPTION OF THE DRAWING

Above mentioned and other objects and features of the present invention will clearly appear from the following detailed description of embodiments of the invention, taken in conjunction with the drawing, which schematically shows a halogen free, oil and fire resistant cable.

DETAILED DESCRIPTION OF THE PREFERRED EMBODIMENT

When installing cables in the mentioned high fire risk areas it is essential when passing from one area to another or from one room or compartment to another that the wall bushings and glands are gas and fluid tight. In order to obtain and maintain gas tight glands it is important that the cable insulation and in particular the filler sheath will not flow under the pressure of the gland. A vulcanized or crosslinked insulation or sheath has this property.

One undesirable property of vulcanized (and thermoplastic) filler sheaths is, however, that they will increase in volume in a fire and cause undesirable radial pressure on the screen wires.

Another problem with cables to be used, for example in the oil industry, is that the commonly used outer protective covers are not oil and abrasion resistant. Some sheaths of PVC would be oil resistant, but such sheaths are not acceptable due to their high halogen content. When subjected to oil the sheath may absorb oil which would be detrimental to the cable core. The oil absorption may also cause expansion of the filling sheath.

It has been found that there must be a close relationship between the properties of the filler sheath and the metal screen.

It has in particular been found that the braid angle of the metal screen is very critical when constructing fire resistant cables. The braid angle α (FIG. 1) is defined as the angle which the individual wires form with a plane at right angles to the cable axis. From a production point of view it will be desirable to use a large braid angle which would allow a high production speed. Experiments have, however, shown that braid angles above 50° are undesirable on cables with vulcanized sheaths, as radial expansion of such sheaths results in axial contraction.

The conductors and possibly the optical fibres involved should be provided with a layer of mica, glass fiber or similar inorganic material which should be covered with an extruded layer e.g. of EPR or silane vulcanized EVA.

The extruded conductor insulation as well as the extruded inner and outer sheaths are halogen free and contain amounts of aluminum trihydrate or similar material containing sufficient crystallization water to give the crosslinked polyolefin copolymeric material self-extinguishing properties. E.g. hydro magnesite may be an alternative material. While the oxygen index of the conductor insulation should be above 24, that of the filler sheath should be between 40 and 50, whereas that of the outer sheath should be above 30.

Whereas the optional outer oil and abrasion resistant layer of nylon is halogen free, the material in itself is combustible, but the layer used in accordance with the present invention is so thin (in order of 0.2 to 0.6 mm) that when placed on top of the self-extinguishing outer protective sheath it will not sustain a fire.

Tests have shown that the cables claimed at least satisfy the following requirements:
  In IEC 331 the cable must stay in operation at the normal working voltage exposed to a flame at 750° C. for three hours. The cables defined pass the test at 1000° C.
  IEC 332-3, 1982 is a flame propagation test carried out on cables mounted on a ladder. The test is divided into three categories A, B and C. The cables in question pass category A which is the most difficult to pass. The number of cable lengths, 3.5 m long, to give 7 liters of combustible (organic) material per meter is mounted on a ladder and placed in the test oven and exposed to a flame for 40 min. The cables pass the test if the height of the burned area does not go higher than 2.5 m above the burner.
  DIN 57472/VDE 0742 part 813 Draft. Indirect determination of corrosiveness of combustion gases. The combustion gases from a sample of each of the cable mateials are led into water. The pH value and the electrolytical conductivity are measured. The test is passed if none of the measured pH values is lower than 4 and if none of the measured electrolytical conductivity values exceeds 100 $\mu S$ cm$^{-1}$.

If necessary these new cable sheaths and covers will also effectively protect the cable core against undue influence of drilling mud, oils and other hydrocarbons. The resistance against abrasion and termite attacks is also excellent.

In experiments for finding the desired braid angle, specimens of cable, 900 mm long, were subjected to flames at temperatures in the range of 750° C.-1000° C. for up to 3 hours. The diameter and lengths of the cable specimens were measured before and after the fire exposure.

These experiments showed that for braid angles over 50° the diameter over the braid increased by more than 10%, and the length of the cable samples shrunk by more than 10 mm. In all these samples with braid angle larger than 50° the cable conductors showed waves and kinks, and in some cases the conductors also shortcircuited to the metal screen.

The experiments also included a number of cable specimens having a braid over the filler sheath in which the braid wires formed less than 45° with a plane perpendicular to the cable axis. As a conclusion the samples having braid angles between 35° and 45° showed less than 10% increase of the diameter over the braid after the fire, and a cable length shrinkage of less than 10 mm. Preferably the braid angle should be chosen to be between 38°-42° in which the range the diameter increase/cable length shrinkage were shown to be in the order of 5% and 5 mm respectively. A too small braid angle can lead to a stiff cable which is difficult to strip, and the production speed would also be reduced.

The sole FIGURE illustrates a cable according to the present invention comprising a cable core including one or more insulated conductors and/or optical fibers. The cable core 1 may be designed to transfer power, telecom and data. In a conventional manner the conductors 2 may be provided with initial layers or windings 4 containing mica, glass fibers or other materials which after a fire provide a sintered insulated layer on the conductor. Optical fibers 3 may be protected in the same or similar manner and/or these may be of the metal clad type to provide fire protection.

The conductor/fiber insulation also includes an extruded self-extinguishing layer 5 over the mica tape so that during installation, when the filler sheath and the outer protective cable layers are removed, there is no need to apply special self-extinguishing covers or tapes over the conductor insulation.

To improve the fire resistance, the conductors may be of the multiwire type described in the above mentioned U.S. Pat. Nos. 3,180,925 and 4,280,016.

The insulated conductors and/or optical fibers and/or groups of conductors/fibers which may be enclosed within a screen 6 of copper/polyester or aluminum/polyester laminate, are embedded in a filler sheath 7 which to a substantial degree contains aluminum trihydrate or similar material as hydro magnesite with bound water of crystallization which at high temperatures gives off water.

The filler sheath 7 is vulcanized to satisfy the hot set test in IEC 92-3 Amendment 3, Appendix GA at 20° C., to provide a cable core suitable for giving fluid and gas tight passage through bushings and glands, and it has an oxygen index between 40 and 50.

Immediately over the filler sheath 7 there is provided a braided metal screen 8 comprising preferably tinned copper wires. The wires of this screen form 35° to 45° with a plane at right angles to the cable axis. As explained above the combination of such a screen 8 and the filler sheath 7 gives a cable which efficiently withstands fires because the cable is prevented from undue shrinkage and the cable conductors are prevented from forming waves and kinks.

The outer protective sheaths include a polyester tape winding 9 and a self-extinguishing sheath 10 having an oxygen index above 30 as well as an optional thin extruded sheath 11 of nylon which effectively protects the cable core against abrasion and damaging hydrocarbons like oil and drilling mud. Several series of experiments have been made to investigate the properties of outer sheaths. Samples of cables being provided with outer sheaths of nylon (trade names Vestamid 164OE, Vestamid L 1801E), Polyurethane, EVA (trade name 407 AE1), PE, PVC, PCP, CSP and CP, were tested according to the following procedures:
  1. Oil-ageing in ASTM No. 2 after IEC 92-3 and Bureau Veritas—1977—Chapter 18.
  2. Ageing of dumb-bell test specimens in drilling mud.

Only two of the sheaths showed satisfactory results in tensile strength, elongation at break and longitudinal swell, namely the nylon sheath and the PVC sheathh. However, the PVC sheath is not acceptable due to its content of halogen materials. While nylon in general gives satisfactory results, nylon 11 and 12 are preferred as outer protective oil and abrasion resistant layer.

While we have described above the principles of our invention in connection with specific apparatus, it is to be clearly understood that this description is made only by way of example and not as a limitation to the scope of our invention as set forth in the objects thereof and in the accompanying claims.

We claim:

1. A fire-resistant communication cable comprising:
   a conductor;
   a cover of an insulating material disposed on the outer surface of said conductor;
   a layer of a self-extinguishing material disposed on the outer surface of said cover of insulating material;
   a sheath of a material which is capable of releasing water of crystallization when subjected to at least a predetermined temperature and which is positioned on the outer surface of said layer of self-extinguishing material;
   a metallic screen positioned on the outer surface of said sheath and including wires braided with respect to a plane perpendicular to the cable axis at an angle in the range between but excluding 35°–45° to reduce longitudial shrinkage of the screen upon an increase in cable diameter and to maintain integrity of said conductor; and
   two outer protective covers located directly on the outer surface of said screen, said covers including a sheath of a self-extinguishing material.

2. The cable as claimed in claim 1 wherein the cover of insulating material includes at least one layer of inorganic particles consisting of mica, glass fibers and similar inorganic particles and compounds.

3. The cable as claimed in claim 1 wherein said self-extinguishing material includes aluminum trihydrate.

4. The cable as claimed in claim 3 wherein said aluminum trihydrate is in an amount sufficient to obtain an oxygen index above 24.

5. The cable as claimed in claim 1 wherein said sheath material includes aluminum trihydrate.

6. The cable as claimed in claim 5 wherein said aluminum trihydrate in said sheath material is in an amount sufficient to obtain an oxygen index of between 40–50.

7. The cable as claimed in claim 1 wherein said outer covers further include a layer of a polyester tape winding located on the inside surface of said sheath.

8. The cable as claimed in claim 7 wherein said self-extinguishing sheath material of said outer cover includes aluminum trihydrate.

9. The cable as claimed in claim 8 wherein said aluminum trihydrate in said self-extinguishing sheath material of said outer covers is in an amount sufficient to obtain an oxygen index above 30.

10. The cable as claimed in claim 1 further comprising an additional outer cover of a layer of a material which is oil impervious and abrasion resistant disposed on the sheath of self-extinguishing material.

11. The cable as claimed in claim 10 wherein said layer of said outer cover is nylon.

12. The cable as claimed in claim 11 wherein said nylon has a thickness of approximately 0.2–0.6 mm.

* * * * *